US006686895B2

(12) United States Patent
Arai et al.

(10) Patent No.: US 6,686,895 B2
(45) Date of Patent: *Feb. 3, 2004

(54) DISPLAY UNIT FOR DISPLAYING AN IMAGE BASED ON A VIDEO SIGNAL RECEIVED FROM A PERSONAL COMPUTER WHICH IS CONNECTED TO AN INPUT DEVICE

(75) Inventors: Ikuya Arai, Yokohama (JP); Kouji Kitou, Yokohama (JP); Yuji Sano, Zushi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/863,261

(22) Filed: May 24, 2001

(65) Prior Publication Data

US 2001/0022582 A1 Sep. 20, 2001

Related U.S. Application Data

(60) Continuation of application No. 09/498,618, filed on Feb. 7, 2000, now Pat. No. 6,304,236, which is a continuation of application No. 08/438,911, filed on May 10, 1995, now Pat. No. 6,057,812, which is a division of application No. 08/013,810, filed on Feb. 2, 1993, now Pat. No. 5,457,473.

(30) Foreign Application Priority Data

Feb. 20, 1992 (JP) ............................................... 4-069320

(51) Int. Cl.[7] ................................................. G09G 1/06

(52) U.S. Cl. ........................................ 345/10; 345/204

(58) Field of Search ............................. 345/10, 11, 168, 345/660, 607, 668, 669, 670, 671, 204; 348/486, 492, 476, 473, 734, 541, 549, 722

(56) References Cited

U.S. PATENT DOCUMENTS 4,007,443 A * 2/1977 Bromberg et al. .......... 345/168
4,159,480 A    6/1979 Tachi (List continued on next page.)

FOREIGN PATENT DOCUMENTS

DE   3722169 A1   1/1989
EP    456923 A1   11/1991
EP   0456923 A1   11/1999

(List continued on next page.)

OTHER PUBLICATIONS

Barco n.v. Video & Communications, The Calibrator Explained, Part 1, Apr. 1990, pp. 1–40.
NASA Tech Brief, "Interface for Color–Video Monitor", Apr. 1988, pp. 246–247.

*Primary Examiner*—Chanh Nguyen
(74) *Attorney, Agent, or Firm*—Mattingly, Stanger & Malur, P.C.

(57) ABSTRACT

An image display apparatus capable of adjusting a display picture by an input unit through a computer body is disclosed. When the user inputs a control instruction for adjusting the display picture of the display unit by the input unit connected to the computer body, a control signal addition circuit prepares a control signal Sc corresponding to the control instruction and adds the control signal to a video signal R, G or B or a synchronizing signal Hs or Vs produced by a display control circuit during a vertical retrace period. A control signal separation circuit separates the added control signal Sc from the video signal R, G or B or the synchronizing signal Hs or Vs produced by the control signal addition circuit. A display control circuit produces adjustment signals Sa and Sb on the basis of the control signal from the control signal separation circuit to adjust a video circuit and a deflection circuit. Thus, the user can adjust the display picture by the input unit near at hand without extending the hands to adjustment switches of the display unit.

4 Claims, 10 Drawing Sheets

U.S. PATENT DOCUMENTS

| | | | |
|---|---|---|---|
| 4,415,985 A | * | 11/1983 | McDaniel |
| 4,574,279 A | | 3/1986 | Roberts |
| 4,626,892 A | | 12/1986 | Nortrup et al. |
| 4,680,647 A | | 7/1987 | Moriyama |
| 4,727,947 A | * | 3/1988 | Naito |
| 4,736,324 A | | 4/1988 | Sainen et al. |
| 4,743,968 A | | 5/1988 | Mogi et al. |
| 4,775,857 A | | 10/1988 | Staggs |
| 4,990,904 A | | 2/1991 | Zenda |
| 4,991,023 A | | 2/1991 | Nicols |
| 5,012,339 A | | 4/1991 | Kurata et al. |
| 5,068,732 A | | 11/1991 | Satoh |
| 5,138,305 A | | 8/1992 | Tomiyasu |
| 5,150,109 A | | 9/1992 | Berry |
| 5,159,683 A | | 10/1992 | Lvovsky et al. |
| 5,227,881 A | | 7/1993 | Wess et al. |
| 5,241,281 A | | 8/1993 | Wilkes et al. |
| 5,251,031 A | | 10/1993 | Tagami |
| 5,270,821 A | | 12/1993 | Samuels |
| 5,276,458 A | | 1/1994 | Sawdon |
| 5,309,174 A | | 5/1994 | Minkus |
| 5,315,695 A | | 5/1994 | Saito et al. |
| 5,396,593 A | | 3/1995 | Mori et al. |
| 5,457,473 A | | 10/1995 | Arai et al. |
| 5,506,602 A | | 4/1996 | Yokoyama |
| 5,576,735 A | | 11/1996 | Kikuchi et al. |
| 6,057,812 A | * | 5/2000 | Arai et al. .................... 345/10 |

FOREIGN PATENT DOCUMENTS

| | | |
|---|---|---|
| JP | 59-101695 | 6/1984 |
| JP | 61-16643 | 1/1986 |
| JP | 1-321475 | 12/1989 |
| JP | 2-103592 | 4/1990 |
| JP | 2-127688 | 5/1990 |
| JP | 3-56993 | 3/1991 |
| JP | 3-116093 | 5/1991 |
| JP | 3-160494 | 7/1991 |
| JP | 04-037787 | 2/1992 |

* cited by examiner

DISPLAY UNIT FOR DISPLAYING AN IMAGE BASED ON A VIDEO SIGNAL RECEIVED FROM A PERSONAL COMPUTER WHICH IS CONNECTED TO AN INPUT DEVICE

This is a continuation application of U.S. Ser. No. 09/498,618, filed on Feb. 7, 2000, now U.S. Pat. No. 6,304,236; which is a continuation application of U.S. Ser. No. 08/438,911, filed on May 10, 1995, now U.S. Pat. No. 6,057,812; which is a divisional application of U.S. Ser. No. 08/013,810, filed Feb. 2, 1993, now U.S. Pat. No. 5,457,473.

BACKGROUND OF THE INVENTION

The present invention relates to an image display apparatus including an input unit such as a keyboard, a computer body and a display unit, and more particularly to an image display apparatus in which a display size, a display position and brightness of a picture in the display unit can be adjusted by the input unit such as the keyboard through the computer body to improve the handling capability. The image display apparatus of the present invention can be used in a work station and an advanced personal computer using a display unit.

At present, in the display units for a computer terminal, the display position and size of the picture and a deflection frequency of a video signal to be displayed are variously different. Accordingly, one display unit for the computer terminal is designed to be able to treat various video signals.

The display unit of this type employs a microcomputer and an LSI memory to provide an optimum picture display for each kind of video signals. Such a display unit in a prior art is disclosed in Japanese Patent Unexamined Publication No. 1-321475, for example.

This conventional display unit is directed to a multi-scan type CRT display unit, which includes a memory in which information relative to display positions and sizes of the picture is stored for each kind of video signals and which is controlled by a microcomputer in that display unit. The information relative to the optimum display position and size of the picture in accordance with an input video signal is read out from the memory and a deflection circuit of the display unit is controlled by the read-out information. Further, when a video signal inputted in the display unit is not known, the memory stores no information relative to the inputted video signal and accordingly adjustment switches disposed on a front panel of the display unit are operated without the intervention of the computer so that information for adjusting the display position and the display size of the picture is inputted. A control circuit such as the microcomputer prepares information for control including deflection and makes adjustment.

In the prior art described above, the display unit is designed to obtain the optimum picture display in accordance with the input video signal, while, in another prior art, a display state is controlled to be switched from the computer body in accordance with the variety of the multimedia. Such a display unit in the prior art is disclosed in Japanese Patent Unexamined Publication No. 2-60193.

This conventional display unit is directed to a CRT display apparatus used in display of an electronic apparatus such as a personal computer and which can switch the number of scanning lines between 200 lines and 400 lines freely and be shared by a television receiver.

More particularly, in the above prior art, the computer body produces a discrimination signal superposed on an video signal during a blanking period and the display unit switches the deflection frequency on the basis of the discrimination signal.

In the former prior art (Publication No. 1-321475) of the above two prior arts, since the display position and size of the picture are all controlled by the display unit, it is necessary for the operator to separate his fingers from the input unit such as the keyboard connected to the computer body and extend his hands to the adjustment switches of the display unit disposed at a separate location to operate the switches when the adjustment of the display position and size of the picture are required. Accordingly, it is troublesome in the handling capability.

Further, in the latter prior art (Publication No. 2-60193), the display state is controlled by the input unit such as the keyboard connected to the computer body, while since only the deflection frequency can be switched only by a binary value, there is a problem that only two specific signals can be treated and a sufficient display state required by the user of the computer can not be obtained.

SUMMARY OF THE INVENTION

It is a primary object of the present invention to solve the problems in the prior arts by providing an image display apparatus capable of adjusting a display picture by an input unit such as a keyboard near at hand through a computer body without extending the hands to adjustment switches of a display unit and obtaining a display state required by the user exactly.

It is another object of the present invention to improve the operability in a computer system and the handling capability of the image display apparatus.

It is still another object of the present invention to provide an image display apparatus capable of adjusting a display picture from a computer body by using a conventional circuit without the provision of a new circuit.

In order to solve the above problems, according to the present invention, in a general computer system, a computer body comprises addition means for adding a control signal for a display picture to a video signal or a synchronizing signal and a display unit comprises separation means for separating the added control signal and control means for adjusting the display state on the basis of the separated control signal.

Alternatively, the computer body comprises preparation means for preparing the control signal to produce it with a predetermined system and the display unit comprises control means for receiving the control signal to adjust the display state on the basis of the control signal.

Alternatively, the computer body comprises display processing means for producing the prepared image data and the control signal for the display picture in the form of a digital signal to the display unit and the display unit comprises control means for preparing an analog video signal and synchronizing signal from the image data and producing an adjustment signal for adjusting a predetermined location of the display unit on the basis of the control signal.

Alternatively, the computer body comprises modulation means for adding the control signal for the display picture to an AC power supply for operating the computer body and the display unit comprises demodulation means for separating the modulated control signal and control means for adjusting an internal circuit of the display unit by the control signal from the demodulation means to obtain a predetermined display picture.

Further alternatively, the control signal from the input unit such as the keyboard is received by the display unit as it is and the display unit comprises instruction identification means for identifying the control signal relative to the adjustment of the display picture and control means for adjusting the display picture on the basis of a signal from the instruction identification means.

The addition means of the computer body adds the control signal for the display unit to the video signal or the synchronizing signal produced by the computer body when the instruction inputted by the input unit such as the keyboard relates to the adjustment of the display picture of the display unit. In the display unit, the separation means takes out the added control signal and the control means adjusts the internal circuit of the display unit in accordance with the control signal to thereby display a predetermined picture.

Alternatively, the preparation means prepares a control signal in accordance with the control signal for the display picture from the input unit such as the keyboard and produces it through an exclusive connection line, and when the control means of the display unit receives the control signal, the control means adjusts a predetermined portion of the internal circuit of the display unit in accordance with the control signal and adjusts the display picture.

Alternatively, the display processing means processes a drawing instruction prepared by a CPU in the computer body to prepare image data for displaying a video signal and prepare a control signal for the display picture, so that the image data and the control signal are produced to the display unit with a predetermined system for transmission and reception of a digital signal. Further, the control means receives the image data and the control signal from the display processing means and prepares the video signal, the synchronizing signal and the adjustment signal for the internal circuit of the display unit.

Alternatively, the modulation means prepares the control signal for the display picture from the information or instruction relative to the adjustment of the display picture and adds the control signal to the AC power supply for the computer body to transmit the control signal. The demodulation means extracts the control signal added by the modulation means. The control means adjusts a predetermined portion of the internal circuit of the display unit on the basis of the control signal from the demodulation means to adjust the display picture.

Further alternatively, the instruction identification means identifies a signal relative to the adjustment of the display picture from signals directly inputted by the input unit such as the keyboard to prepares the control signal for adjustment. The control means adjusts the predetermined portion of the internal circuit of the display unit in accordance with the control signal from the instruction identification means to adjust the display picture.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Figure 1:
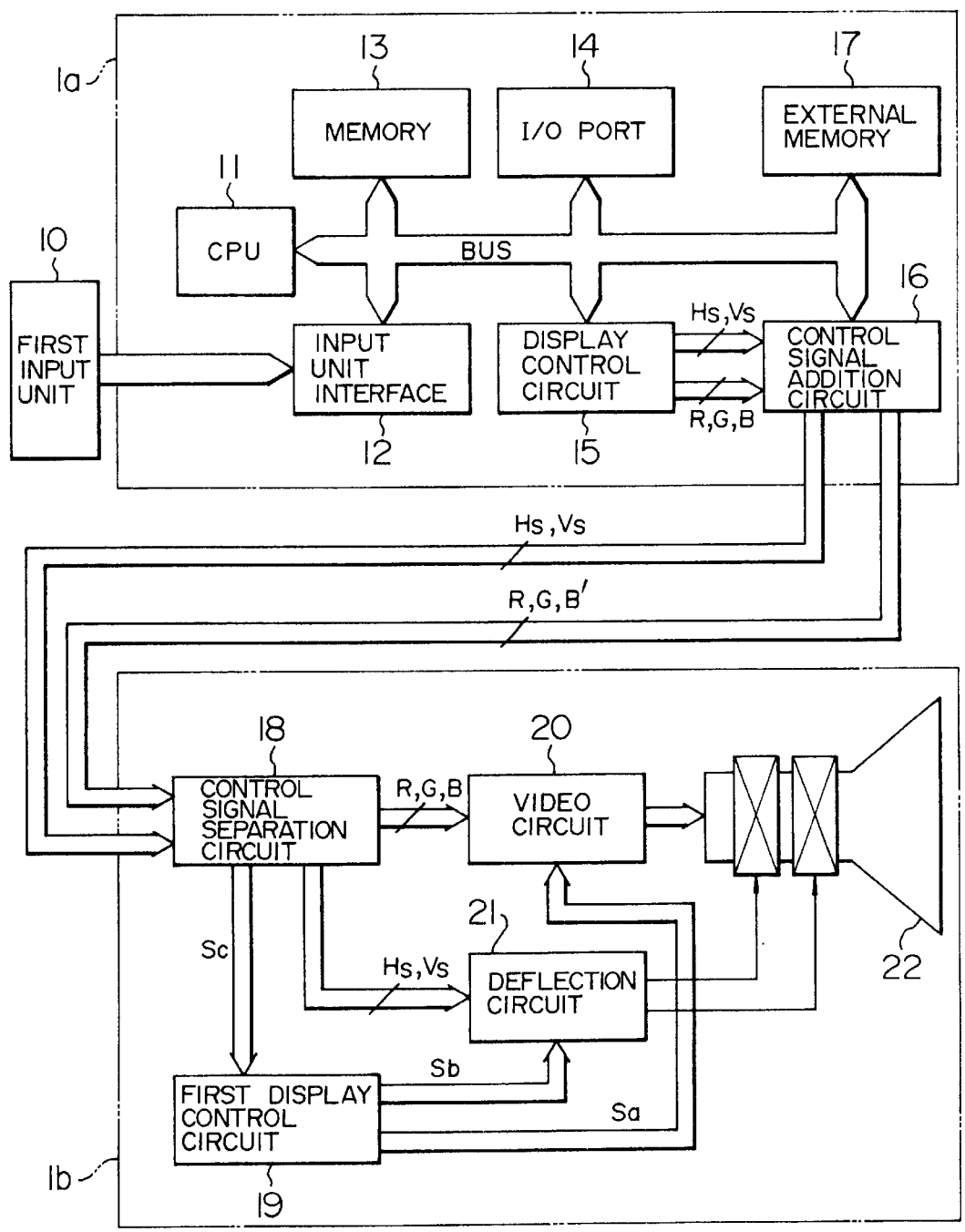
FIG. 1 is a block diagram schematically illustrating a first embodiment of an image display apparatus according to the present invention.

FIG. 1 is a block diagram schematically illustrating a first embodiment of an image display apparatus according to the present invention. In FIG. 1, numeral $1a$ denotes a computer body, in which numeral 11 a CPU, 12 an input unit interface connected to the computer body $1a$ for processing various instruction signals inputted from a first input unit 10 (which transmits a user's intention to the computer) such as a keyboard, a mouse, a pen for input, 13 a memory circuit constituting a main memory, 14 an input/output port for connection with a peripheral device not shown, 15 a display control circuit for producing a video signal and a synchronizing signal for driving a display unit, 16 a control signal addition circuit for superposing or adding a control signal to the video signal or the synchronizing signal produced by the display control circuit 15, and 17 an external memory constituted by a floppy disk, a hard disk or a memory card which is disposed separately from the memory circuit 13. Further, numeral $1b$ denotes a display unit, in which numeral 18 denotes a control signal separation circuit for extracting the control signal from the video signal or the synchronizing signal on which the control signal produced by the control signal addition circuit 16 is superposed, 19 a first display control circuit for producing an adjustment signal for a predetermined circuit on the basis of the control signal extracted by the control signal separation circuit 18, 20 a video circuit, 21 a deflection circuit constituting display drive means, and 22 a cathode ray tube for displaying a video signal.

Operation of FIG. 1 is now described. In the computer body $1a$, other portions except the control signal addition circuit 16 are the same as the general configuration of a conventional personal computer or work station.

When the user of the computer inputs a control instruction for adjustment of the display picture in the display unit $1b$ by means of a first input unit 10 such as a keyboard, a mouse, a pen for input connected to the computer body $1a$, the input unit interface 12 converts the control instruction into a digital signal, which is recognized by the CPU 11 which controls the control signal addition circuit 16.

The control signal addition circuit 16 prepares a control signal Sc in accordance with the control instruction. The control signal Sc for the display unit $1b$ is superposed during the vertical retrace period on the video signal R, G or B or the synchronizing signal for display produced by the display control circuit 15. The signal on which the control signal Sc is superposed is represented with the prime ('). The control signal Sc is prepared in accordance with the control instruction inputted in the input unit 10.

The control signal separation circuit 18 of the display unit 1b separates the added control signal Sc from the video signal R, G or B or the synchronizing signal Hs or Vs produced by the control signal addition circuit 16 to supply it the first display control circuit 19 and supplies the video signals R, G and B to the video circuit 20 and the synchronizing signals Hs and Vs to the deflection circuit 21, respectively.

The first display control circuit 19 produces adjustment signals Sa and Sb for the video circuit 20 and the deflection circuit 21 on the basis of the inputted control signal Sc, respectively, and supplies the signals Sa and Sb to the video circuit 20 and the deflection circuit 21, respectively, to adjust them.

In this way, the display picture is adjusted, so that the user's desired picture is displayed in the cathode ray tube 22.

Figure 2:
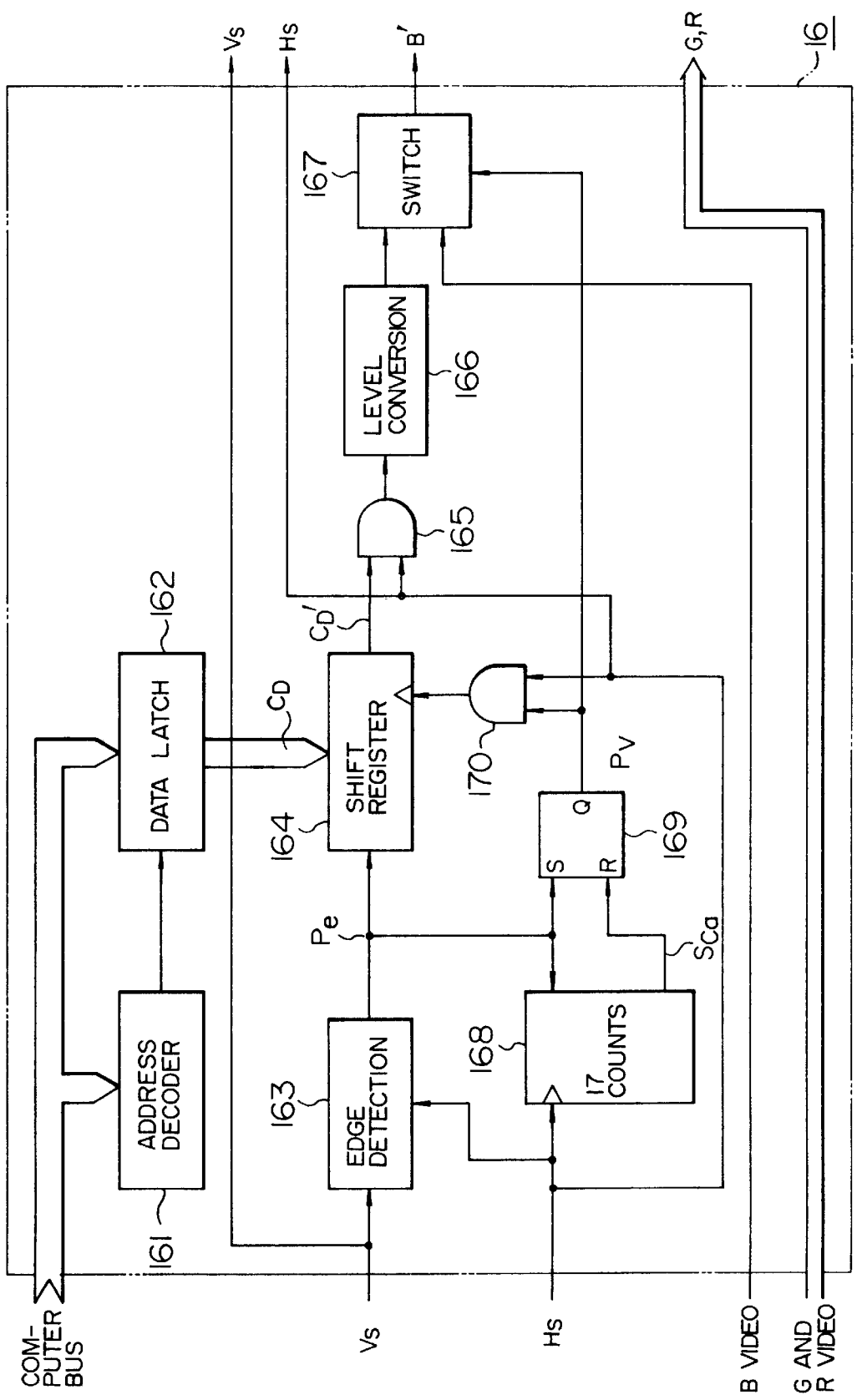
FIG. 2 is a block diagram schematically illustrating an actual example of a control signal addition circuit and a display control circuit shown in FIG. 1.
Figure 3:
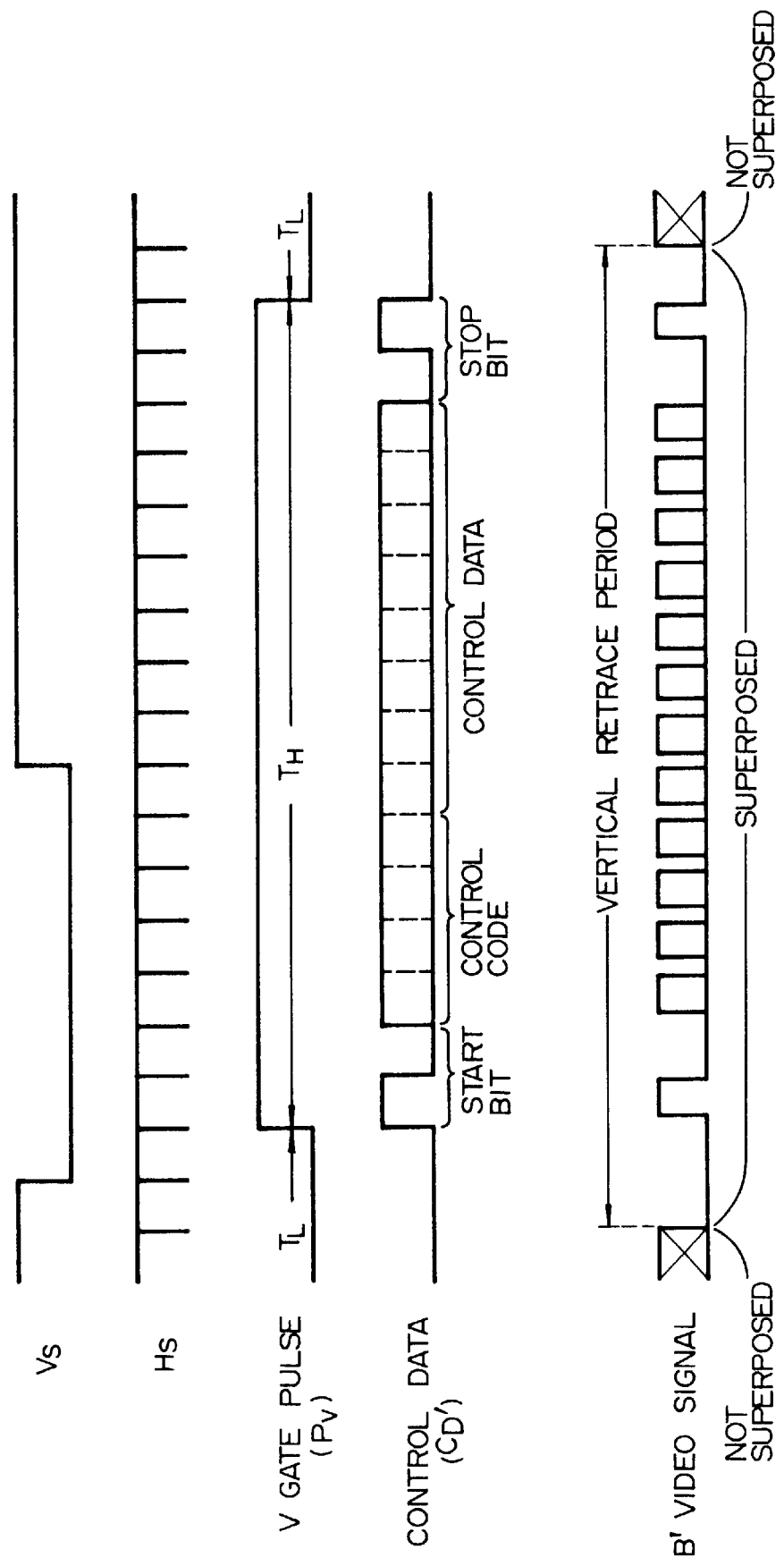
FIG. 3 is a waveform diagram of signals of FIG. 2.

FIG. 2 is a block diagram schematically illustrating an actual example of the control signal addition circuit 16 of FIG. 1 and FIG. 3 is a waveform diagram illustrating waveforms of signals in FIG. 2.

In FIG. 2, numeral 161 denotes an address decoder, 162 a data latch circuit, 163 an edge detection circuit for detecting an edge of a pulse, 164 a shift register circuit, 165 and 170 AND circuits, 166 a level conversion circuit for converting a level of a signal, 167 an analog switch, 168 a counter circuit for counting 17 clock pulses, and 169 a set and reset type flip-flop circuit (hereinafter, referred to as an RSFF circuit).

Operation of FIG. 2 is now described.

As described above, when the user of the computer inputs the control instruction for adjustment of the display picture of the display unit 1b by means of the input unit 10 connected to the computer 1a, the input unit interface 12 supplies the control instruction to the CPU 11 through a computer bus BUS. Then, the CPU 11 recognizes the control instruction and supplies a control data $C_D$ to the control signal addition circuit 16 through the computer bus BUS.

The address decoder 161 supplies the control data $C_D$ to the data latch circuit 162 when the control data supplied to the decoder is a control data for adjusting the display picture of the display unit 1b. Then, the edge detection circuit 163 detects a leading edge of the vertical synchronizing signal Vs by means of the horizontal synchronizing signal Hs and supplies the edge detection pulse Pe to the shift register circuit 164, the counter circuit 168 and the RSFF circuit 169.

The counter circuit 168 is supplied with the edge detection pulse Pe as a reset signal and with the horizontal synchronizing signal Hs as a clock signal and starts its counting operation in response to the rising edge of the clock signal. When the counter circuit 168 counts 17 clocks after input of the reset signal, the counter circuit produces a carry output signal Sca which is supplied to a reset input terminal of the RSFF circuit 169. Thus, the RSFF circuit 169 produces a V gate pulse Pv as shown in FIG. 3. The control signal Sc for the display unit 1b is superposed during a high level period $T_H$ of the V gate pulse Pv.

On the other hand, the shift register circuit 164 reads the control data $C_D$ held in the data latch circuit 162 in response to the edge detection pulse Pe supplied from the edge detection circuit 163. The shift register circuit 164 performs the shift operation in response to the clock signal constituted by the horizontal synchronizing signal Hs produced from the AND circuit 170 during the high level period $T_H$ of the V gate pulse to produce the control data $C_D'$ shown in FIG. 3.

Further, the control data $C_D'$ is supplied to the AND circuit 165 which produces a logical product of the control data $C_D'$ and the horizontal synchronizing signal Hs. The output signal of the AND circuit is converted into a video signal level by the level conversion circuit 166 to be supplied to the switch circuit 167. Other input of the switch circuit 167 is supplied with a B (blue) video signal directly without being processed, and the switch circuit 167 selects the output of the level conversion circuit 166 during the high level period $T_H$ and the B video signal during other low level period $T_L$ by using the V gate pulse Pv as a change-over control signal for the switch to be able to obtain a B' video signal on which the control signal is added as shown in FIG. 3. In the embodiment, the control signal Sc is added to the B video signal having a low visual sensitivity of color, while the control signal may be added to other R (red) or G (green) visual signal or the synchronizing signal Hs or Vs.

Figure 4:
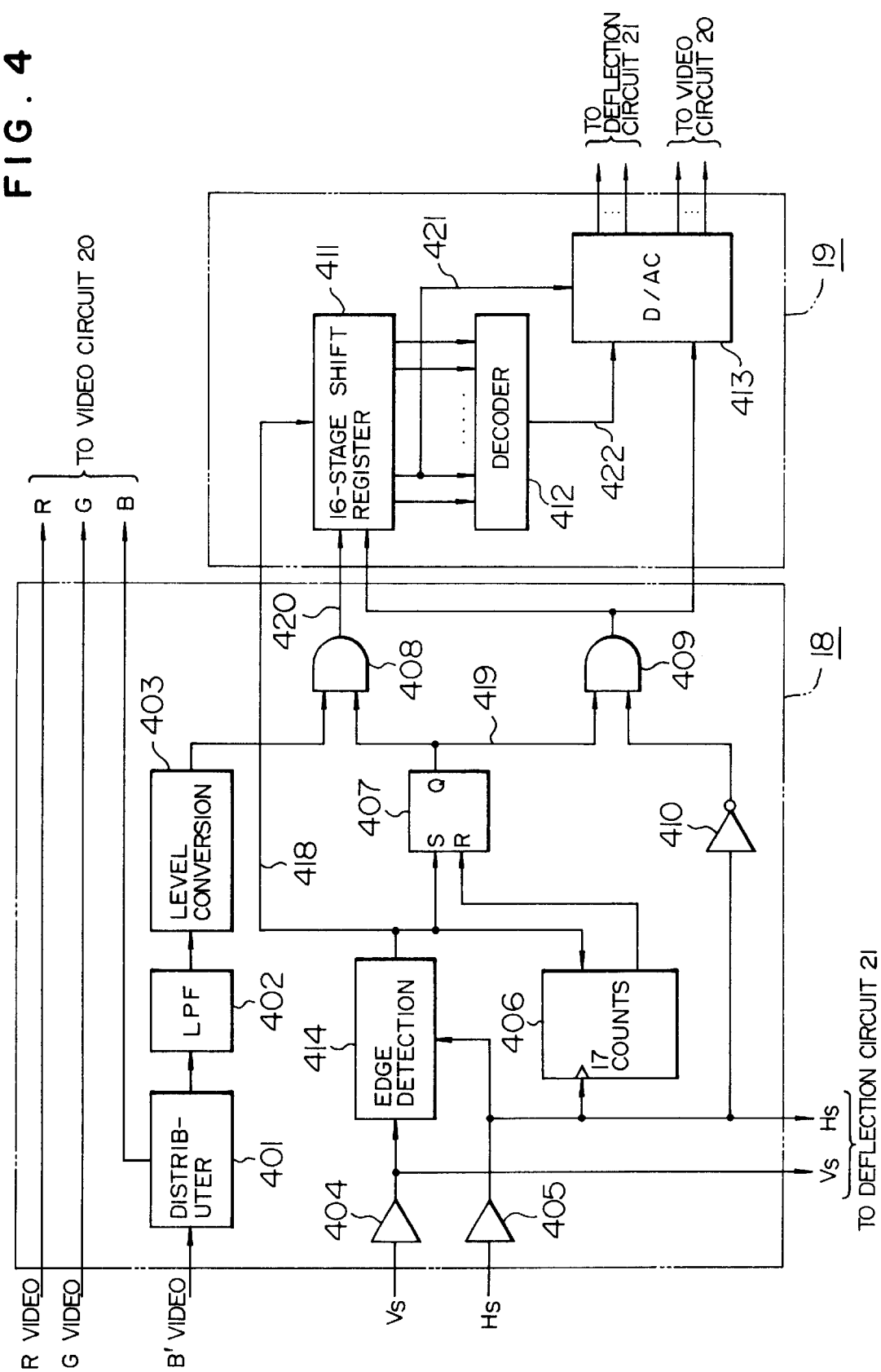
FIG. 4 is a block diagram schematically illustrating an actual example of a control signal separation circuit and the display control circuit shown in FIG. 1.
Figure 5:
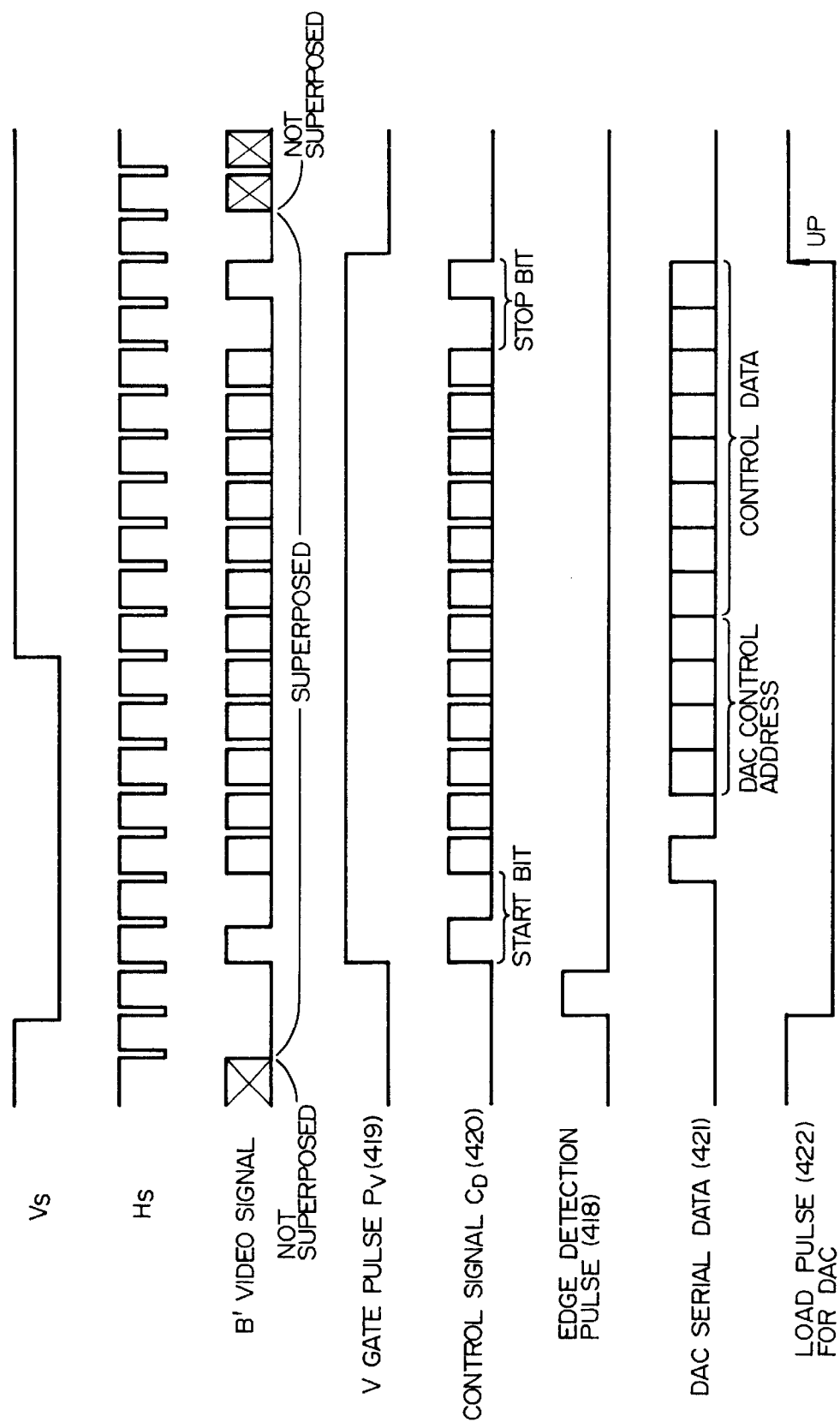
FIG. 5 is a waveform diagram of signals of FIG. 4.

FIG. 4 is a block diagram schematically illustrating a first embodiment of the control signal separation circuit 18 and the first display control circuit 19 of FIG. 1 and FIG. 5 is a waveform diagram showing waveforms of signals in FIG. 4.

In FIG. 4, numeral 401 denotes a distributer, 402 a low pass filter (hereinafter referred to as an LPF), 403 a level conversion circuit, 404 and 405 buffers, 406 a divide-by-17 counter or 17-step counter, 407 an RSFF circuit, 408 and 409 AND circuits, 410 an inverter, 411 a 16-stage shift register, 412 a decoder circuit, 413 a D/A conversion circuit (hereinafter referred to as a D/AC), and 414 an edge detection circuit.

Operation of FIG. 4 is now described with reference to FIG. 5.

The B' video signal from the control signal addition circuit 16 is supplied to the distributer 401 which divides the video signal into two signals, one of which is supplied to the video circuit 20 shown in FIG. 1 together with other video signals R and G and the other of which is supplied to the LPF 402. With the B' video signal supplied to the LPF 402, an unnecessary frequency component such as noise contained in the B' video signal is removed in the LPF 402 and the B' video signal is then converted into a digital signal level in the level conversion circuit 403.

Further, the vertical synchronizing signal Vs is supplied through the buffer 404 to the edge detection circuit 414, in which the leading edge thereof is detected and is supplied to the 17-step counter 406, the RSFF circuit 407 and the 16-stage shift register 411 as an edge detection pulse 418 shown in FIG. 5.

When the 17-step counter circuit 406 is reset by the edge detection pulse 418, the 17-step counter circuit 406 starts its counting operation for the horizontal synchronizing signal Hs supplied through the buffer 405 as a clock signal. Thus, when rising edges of 17 clocks are counted, the counter circuit produces a 17-clock detection pulse. The RSFF circuit 407 is set by the edge detection pulse 418 and reset by the 17-clock detection pulse to produce the V gate pulse 419 shown in FIG. 5.

The AND circuit 408 takes a logical product of an output signal of the level conversion circuit 403 and the V gate pulse of the RSFF circuit 407 to extract the control signal 420 added to the B' video signal. Further, the other AND circuit 409 takes a logical product of the V gate pulse and the horizontal synchronizing signal Hs produced by the buffer 405 and inverted by the inverter 410 to produce a clock signal for the 16-stage shift register 411 and the D/AC (D/A Converter) 413.

The 16-stage shift register 411 is reset by the edge detection pulse 418 to clear the held contents thereof and successively holds the control signal 420 in response to the clock signal from the AND circuit 409. The decoder circuit 412 decodes four held values at the first, second, fifteenth and sixteenth stages of the 16-stage shift register 411, and when the decoder circuit detects the start bit and the stop bit in the control signal 420, the decoder circuit produces a load pulse 422 for the D/AC 413. Further, the output signal from the second-stage of the shift register 411 is used as a serial data 421 of the D/AC 413 shown in FIG. 5.

The D/AC 413, which is a serial input and multi-channel D/A converter, selects any of a plurality of D/A converters included therein in accordance with D/AC control address in the serial data 421 shown in FIG. 5 and updates the D/A converted output value in accordance with a value of the control data portion. At this time, the serial data 421 is successively taken in the D/AC 413 in synchronism with the clock signal from the AND circuit 409 and is settled by the rising edge (UP) of the load pulse from the decoder 412.

Thus, the video circuit 20 and the deflection circuit 21 shown in FIG. 1 can be adjusted by an adjustment voltage or current produced from the D/AC 413 as an adjustment signal.

Figure 6:
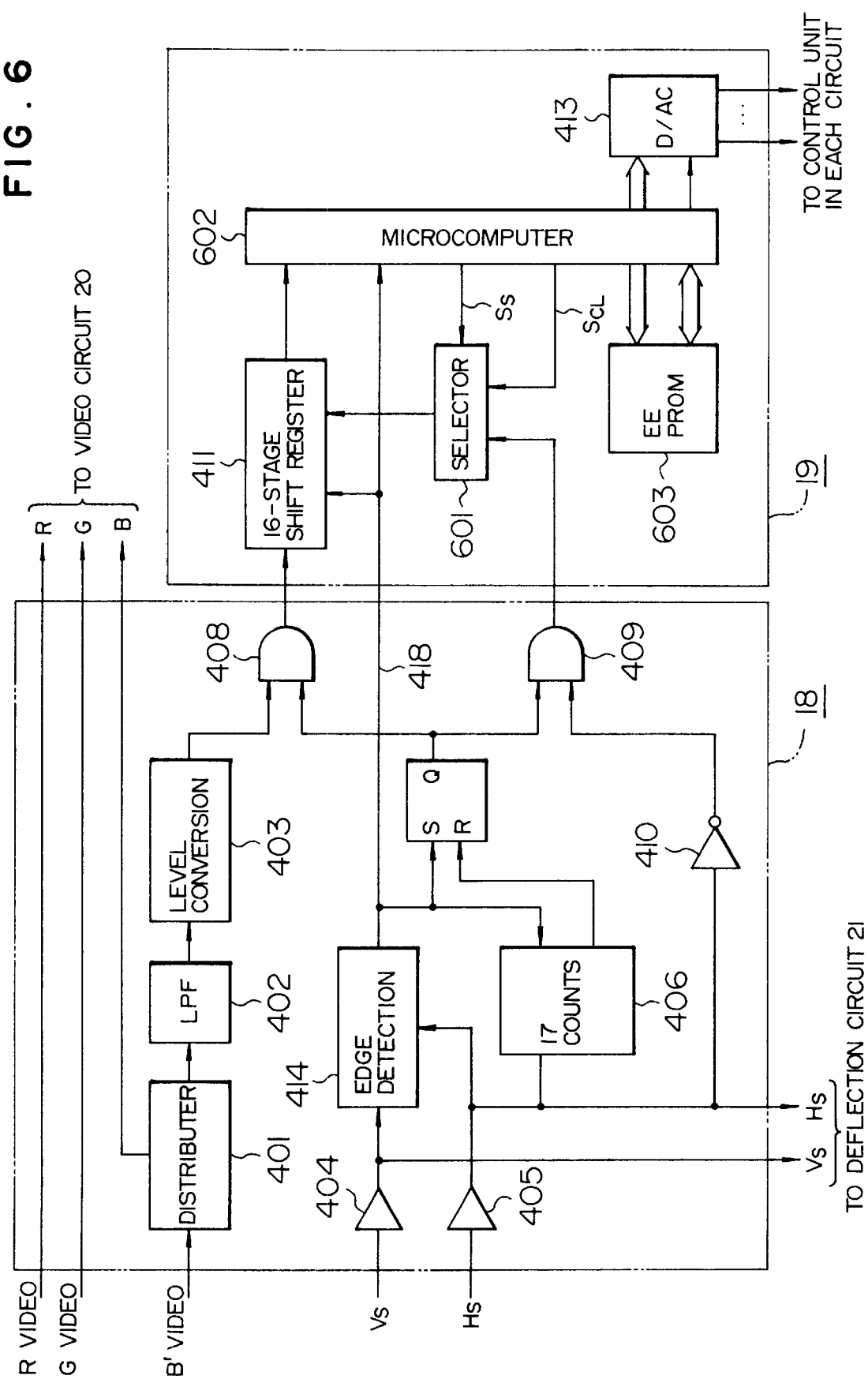
FIG. 6 is a block diagram schematically illustrating another actual example of the control signal addition circuit and the display control circuit shown in FIG. 1.

FIG. 6 is a block diagram schematically illustrating a second actual example of the control signal separation circuit 18 and the display control circuit 19 of FIG. 1. In FIG. 6, numeral 601 denotes a selector, 602 a one-chip microcomputer, and 603 a writable read-only memory (hereinafter referred to as EEPROM (Electric Erasable Programmable Read Only Memory)). Other elements having the same number as in FIG. 4 have the same function.

Operation of FIG. 6 is now described.

The operation that the control signal Sc added to the B' video signal is separated by the AND circuit 408 and the clock signal for writing of the shift register 411 is prepared by the AND circuit 409 is quite the same operation as that of FIG. 4. In the second example, the microcomputer 602 is used to process the control signal to the display unit 1b sent from the computer body 1a shown in FIG. 1.

First of all, usually, the microcomputer 602 controls the-selector 601 to select the clock signal for writing from the AND circuit 409 and write the control signal in the shift register circuit 411. At this time, the edge detection pulse from the edge detection circuit 414 is supplied to the microcomputer 602 as an interrupt signal 418 and after a predetermined time the microcomputer 602 controls the selector 601 by a selector control signal Ss to select the clock signal $S_{CL}$ for reading from the microcomputer 602.

The control signal held in the shift register circuit 411 is successively read out in response to the clock signal $S_{CL}$ for reading from the microcomputer 602 and is supplied to the microcomputer 602. When the signal supplied to the microcomputer is the correct control signal, the microcomputer 602 produces the control data to supply it to the D/AC 413 to thereby adjust a predetermined circuit in the display unit 1b. Further, the control data is also written in the EEPROM 603. Thus, when the display unit 1b is next turned on, the control data is read out from the EEPROM 603 to perform the predetermined adjustment.

Further, in the second example, by previously storing the control data in the EEPROM 603, a necessary control data can be read out in accordance with the control signal $S_C$ from the computer body 1a. Accordingly, the control information for the display unit 1b can-be previously programmed in the software for operating the computer body in addition to the control information from the input unit 10, so that a predetermined adjustment can be made for each software.

As described above, in the first embodiment of the present invention, the control signal is added to the video signal or the synchronizing signal during the vertical retrace period, while a DC level itself of the video signal can be used as the control signal. In this case, the control signal separation circuit 18 may reproduce the DC level of the video signal and adjust the predetermined circuit of the display unit 1b in accordance with a voltage value of the DC level. Further, in the first embodiment, the video circuit 20 and the deflection circuit 21 of the display unit 1b are adjusted, while a high-voltage circuit portion can be naturally controlled to adjust the focus or the like.

Figure 7:
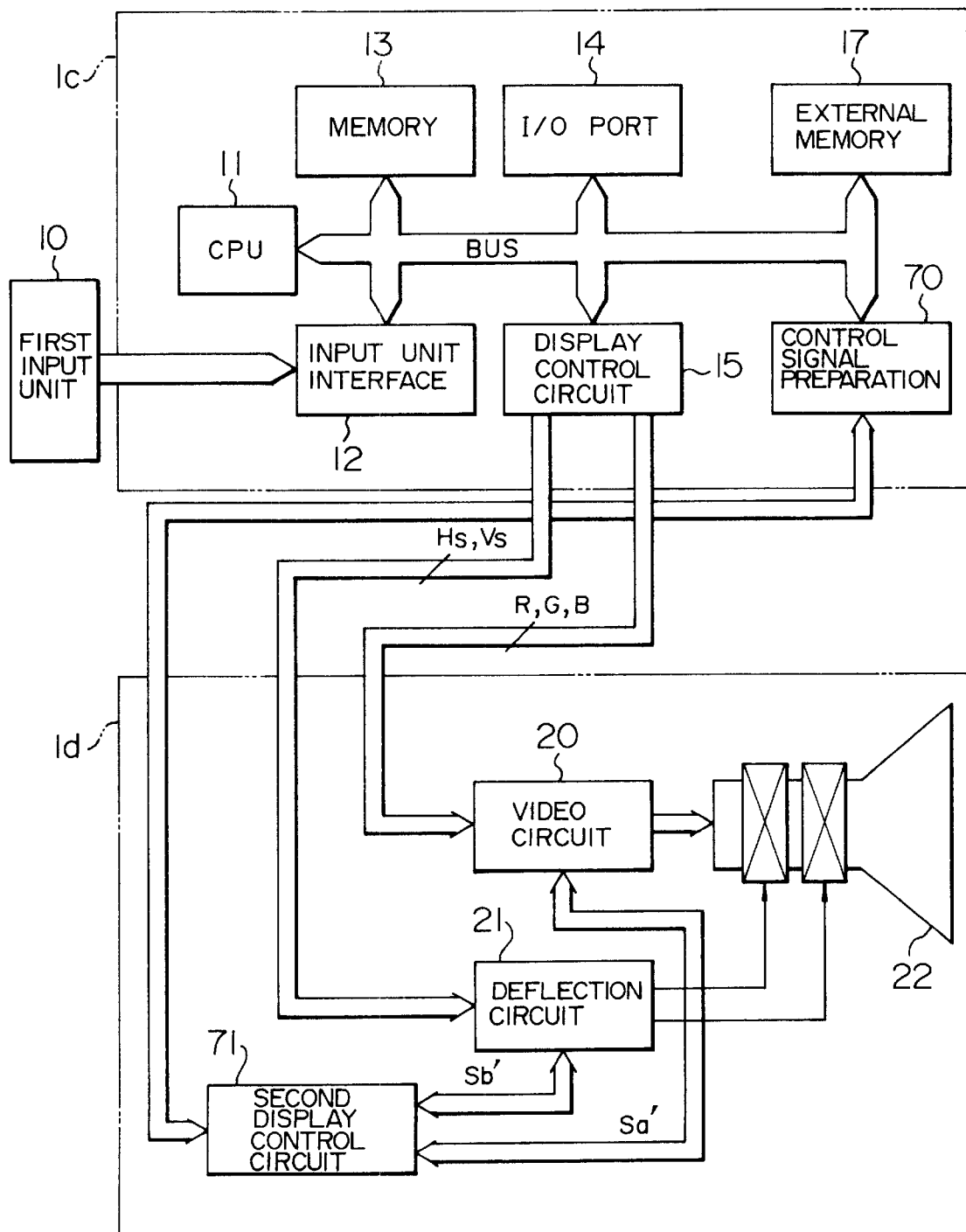
FIG. 7 is a block diagram schematically illustrating a second embodiment of an image display apparatus according to the present invention.

FIG. 7 is a block diagram schematically illustrating a second embodiment of the present invention. In FIG. 7, numeral 1c denotes a computer body different from the computer body shown in FIG. 1 and in the computer body 1c, numeral 70 denotes a control signal preparation circuit. Further, numeral 1d denotes a display unit different from the display unit shown in FIG. 1 and in the display unit 1d, numeral 71 denotes a second display control circuit different from the first display control circuit 19 shown in FIG. 1. Other elements designated by the same numerals as those of FIG. 1 have the same function as that of the elements of FIG. 1.

Operation of FIG. 7 is now described briefly.

In FIG. 7, the video signal and the synchronizing signal are produced by the display control circuit 15 in the same manner as in a general personal computer or work station.

When the user of the computer inputs the control instruction for adjusting the display picture of the display unit 1d by means of the input unit 10 connected to the computer body 1c, the control instruction is sent to the control signal preparation circuit 70 through the input unit interface 12, the CPU 11 and the computer bus BUS.

The control signal preparation circuit 70 holds the control instruction and prepares the control signal corresponding to the control instruction to produce it to the display unit 1d at a proper timing. An output system of the control signal at this time can use an existing interface such as, for example, RS-232C, GP-IB and SCSI. Accordingly, the control signal preparation circuit 70 includes the interface circuit.

The second display control circuit 71 of the display unit 1d receives the control signal produced by the control signal preparation circuit 70 through the same interface circuit as that included in the control signal preparation circuit 70 and produces the adjustment voltage or current for the video circuit 20 and the deflection circuit 21 as the adjustment signal on the basis of the received control signal to adjust the video circuit 20 and the deflection circuit 21.

In the second embodiment of the present invention, since the control signal is transmitted and received by means of the general-purpose interface, bidirectional communication between the display unit 1d and the computer body 1c can be made. Accordingly, the computer body can recognize whether the display unit 1d has received the control signal exactly or not, how the control state of the display unit 1d at the current time is or whether the display unit 1d is exactly operated or not.

Figure 8:
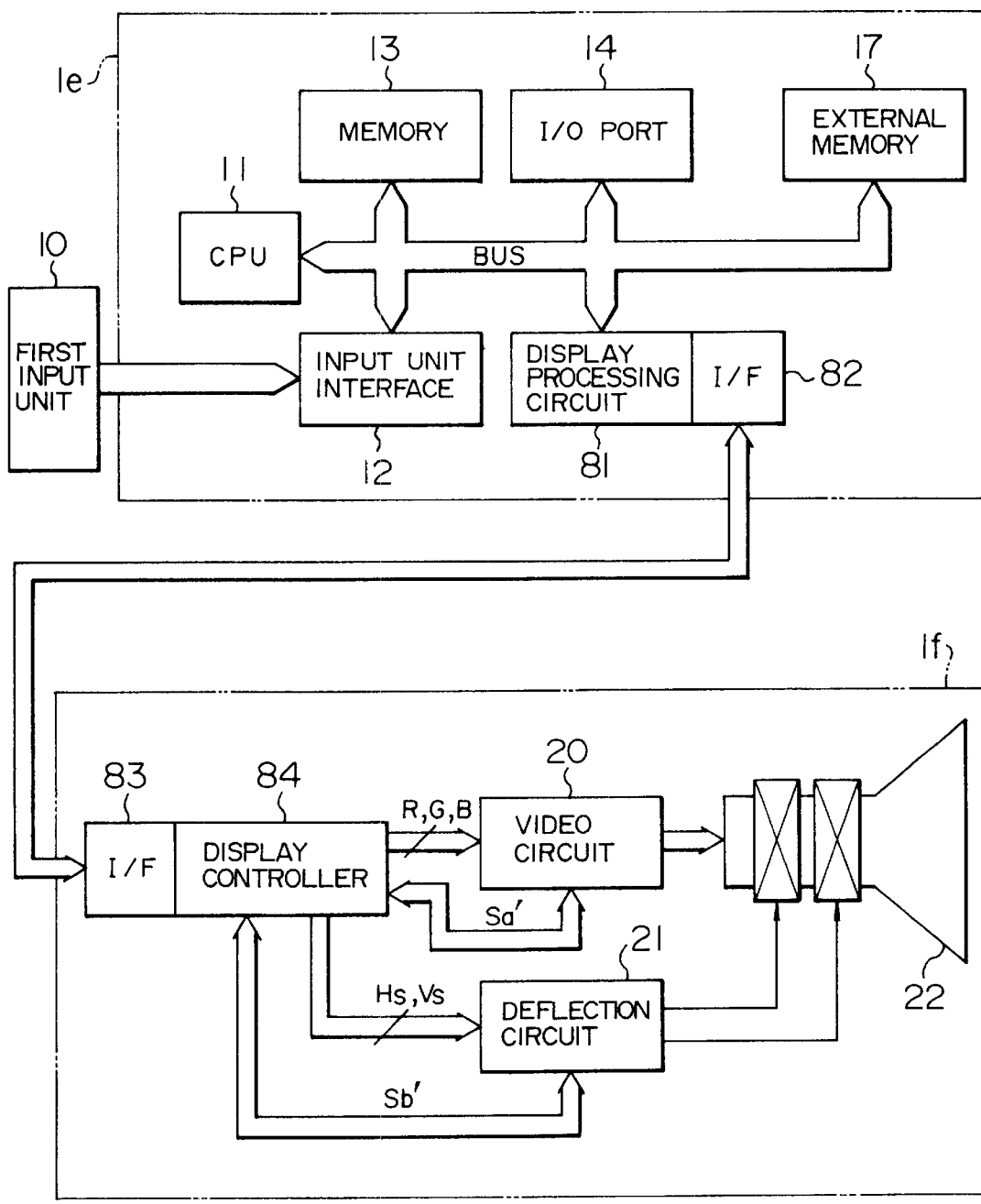
FIG. 8 is a block diagram schematically illustrating a third embodiment of an image display apparatus according to the present invention.

FIG. 8 is a block diagram schematically illustrating a third embodiment of the present invention. In FIG. 8, numeral 1e represents a computer body different from that of FIGS. 1 and 7 and in-the computer body 1e, numeral 81 represents a display processing circuit for preparing an image data for a display image, and 82 an interface circuit. Numeral if represents a display unit different from that of FIGS. 1 and 7, 83 an interface circuit, and 84 a display controller for preparing various signals for driving the display unit 1f. The interface circuits (hereinafter referred to as an I/F circuit) 82 and 83 serve to transmit and receive signals between the display processing circuit 81 in the computer body 1e and the display controller 84 in the display unit 1f. Other elements having the same numerals as those of FIGS. 1 and 7 have-the same function.

Operation of FIG. 8 is now described.

An image processing instruction issued by the CPU 11 is supplied to the display processing circuit 81 through the computer bus BUS. The display processing circuit 81 receives the image processing instruction and prepares the image data for the display image.

At this time, when the user of the computer inputs the control instruction for adjusting the display picture of the display unit 1f by means of the input unit 10 connected to the computer body 1e, the control instruction is sent to the display processing circuit 81 through the input unit interface 12, the CPU 11 and the computer bus. When the display processing circuit 81 receives the control instruction, the display processing circuit 81 prepares the control signal in a predetermined location other than the image data area.

The image data and the control signal thus prepared are sent to the display unit 1f through the I/F circuit 82 as the image information in accordance with a predetermined interface specification, for example, the SCSI standards having a large transfer rate.

In the display unit 1f, the I/F circuit 83 receives the image information from the I/F circuit 82 and supplies the image information to the display controller 84 successively. The display controller 84 writes the received image information into an internal memory successively and prepares the video signals for R, G and B and the synchronizing signal from the image data portion of the written image information. Further, when the control signal is present in the image information, the adjustment voltage or current as the adjustment signals Sa' and Sb' for the video circuit 20 and the deflection circuit 21 is produced to adjust the video circuit 20 and the deflection circuit 21.

In addition, when the image information written in the internal memory of the display controller 84 is not updated within a predetermined time, the display controller 84 controls the video circuit 20 to minimize an amplitude level of the video signal, so that the brightness of the cathode ray tube 22 is reduced to prevent burning of the cathode ray tube 22.

Even in the third embodiment of the present invention, since the interfaces between the computer body 1e and the display unit 1f have the capability for bidirectional communication, not only the image data and the control signal can be transmitted from the computer body 1e but also a signal for reception confirmation and a report signal for operation situation can be transmitted from the display unit 1f. Further, since the computer body 1e is connected to the display unit 1f through a single interface cable, the complexity of the connection can be solved.

Figure 9:
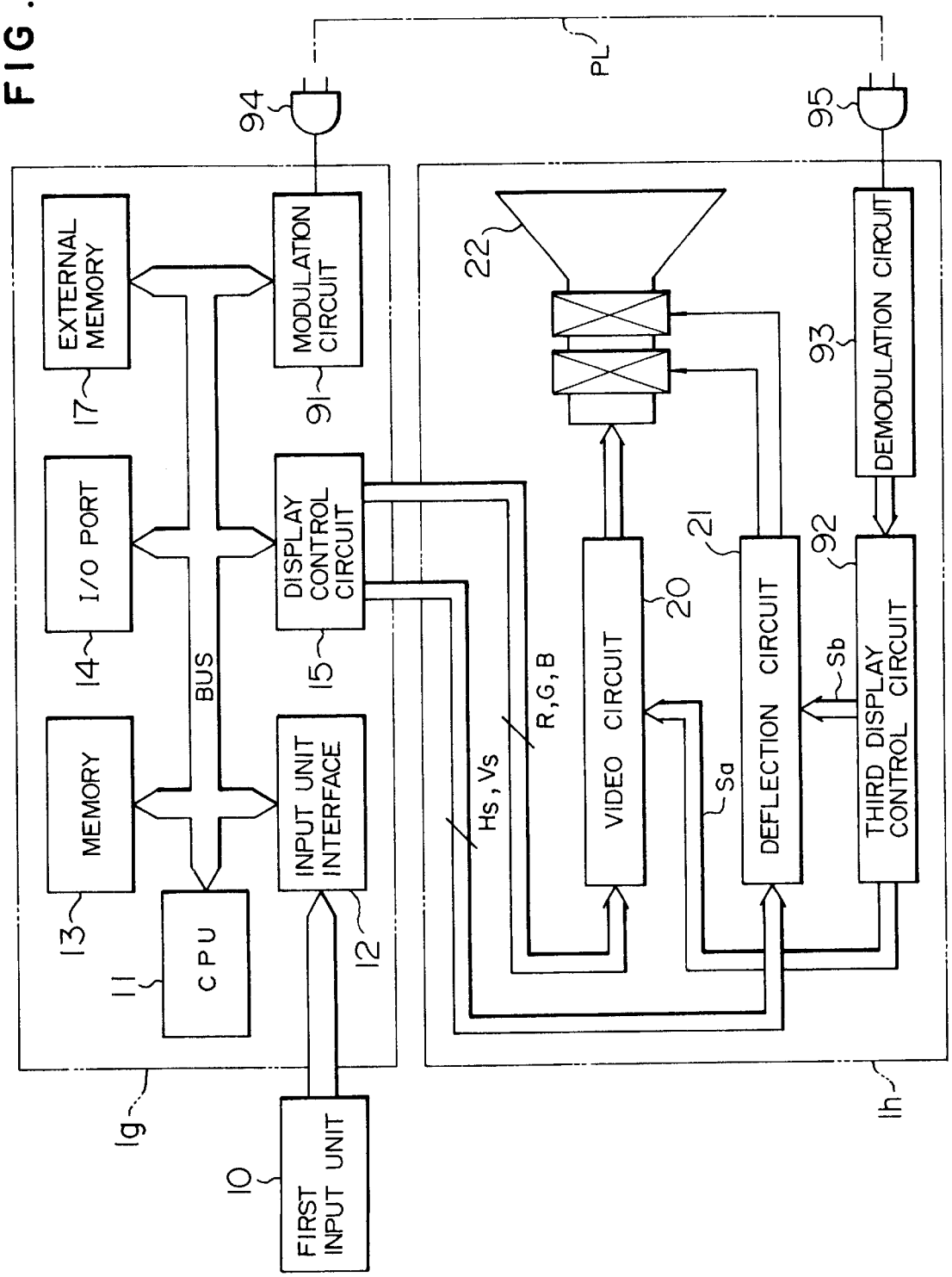
FIG. 9 is a block diagram schematically illustrating a fourth embodiment of an image display apparatus according to the present invention.

FIG. 9 is a block diagram schematically illustrating a fourth embodiment of the present invention. In FIG. 9, numeral 1g represents a computer body different from that of FIGS. 1, 7 and 8, and in the computer body 1g, numeral 91 represents a modulation circuit. Numeral 1h represents a display unit different from that of FIGS. 1, 7 and 8, and in the display unit 1h, numeral 92 represents a display control circuit, 93 a demodulation circuit, and 94 and 95 power plugs. Other elements having the same numerals as those of FIG. 1 have the same function.

Operation of FIG. 9 is now described.

When the user of the computer inputs the control instruction for adjusting the display picture of the display unit 1h by means of the input unit 10 connected to the computer body 1g, the control instruction is supplied to the CPU 11 through the input unit interface 12. The CPU 11 processes the control instruction and supplies the control signal corresponding to the control instruction to the modulation circuit 91 through the computer bus BUS. The modulation circuit 91 modulates the received control signal and superposes it to the AC power to-transmit the signal from the power plug 94 through a power line PL to the display unit 1h.

In the display unit 1h, when the AC power is supplied from the power plug 95 through the power line PL, the demodulation circuit 93 demodulates the modulated control signal superposed on the AC power to reproduce the original control signal. The reproduced control signal is supplied to the display control circuit 92. The display control circuit 92 produces the adjustment voltage or current as the adjustment signals Sa and Sb for the video circuit 20 and the deflection circuit 21 in accordance with the contents of the control signal to adjust the video circuit 20 and the deflection circuit 21.

In this manner, in the embodiment, since the control signal is transmitted to the display unit 1h through the power line PL, the display unit 1h can be controlled without increased signal line for the control signal.

Figure 10:
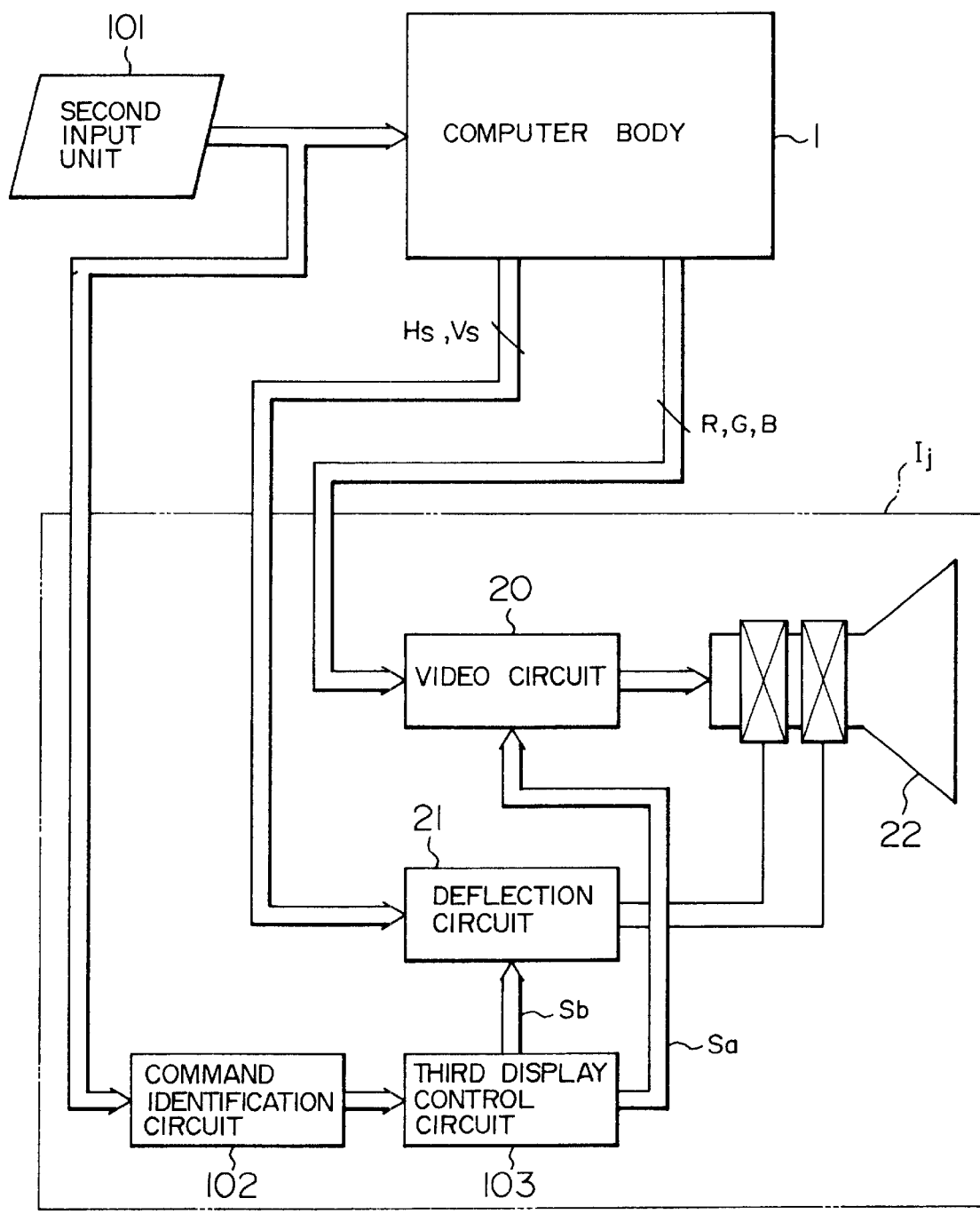
FIG. 10 is a block diagram schematically illustrating a fifth embodiment of an image display apparatus according to the present invention.

FIG. 10 schematically illustrates a fifth embodiment of the present invention. The fifth embodiment is now described briefly. In FIG. 10, numeral 1 represents a computer body constituted by a general personal computer or work station, 1j a display unit different from that of the preceding embodiments 101 a second input unit such as a keyboard, a mouse, or a pen for unit connected to the computer body 1 and the display unit 1j, 102 a command identification circuit in the display unit, and 103 a third display control circuit. Other elements having the same numerals as those of FIG. 1 have the same function.

In FIG. 10, when the user of the computer operates the second input unit 101, an input signal such as the control instruction is inputted to the computer body 1 and the display unit 1j. The input signal inputted to the display unit 1j is processed by the command identification circuit 102 and is taken out as the display control signal when the input signal is an instruction relative to the display control. The third display control circuit 103 makes control relative to the display operation by the control voltage or current with respect to the associated portion of the video circuit 20 and the deflection circuit 21 on the basis of the display control signal. In the embodiment of FIG. 10, since the computer body does not prepare the control signal for the display, there is no burden bearing upon the CPU of the computer. In this manner, the user of the computer can control the display unit by means of the second input unit without direct contact to the display unit. The signal line connected from the second input unit 101 to the display unit 1j may use the signal lines connected to the computer body 1 as they are or may be an exclusive signal line for transmitting only the display control signal. For the former case, the input unit such as the general keyboard can be utilized as it is. For the latter case, it is necessary to add a special input unit for display control to the second input unit. Further, a remote control circuit employing the infrared rays or the like is used to reduce the number of connection lines between the second input unit 101 and the display unit 1*j*, so that the complexity due to wiring can be reduced. In the fifth embodiment, an input unit such as a mouse, a touch panel, a pen for input or the like can be naturally used as the input means for the control instruction in addition to the keyboard.

According to the present invention, the following effects are attained:

(1) The user of the computer can adjust the display picture by the input unit such as the keyboard near at hand through the computer body without extending the hands to adjustment switches of the display unit.
(2) The user can obtain the necessary display state exactly.
(3) The operability in the computer system and the handling capability of the display unit are improved.
(4) The individual user can adjust the display state of the image display apparatus in accordance with circumstances.
(5) The adjustment of the display picture can be attained with the minimum control hardware.
(6) Standard lines can be used without the provision of new lines.
(7) The complexity due to wiring can be avoided by using the remote control circuit.
(8) It is possible to automatically adjust the optimum picture to be displayed on the display unit by adjusting the operation of software by means of the control program of a display integrated into the application program at the computer side, and accordingly it is unnecessary for the user to take care the adjustment of the display.

What is claimed is:

1. A display unit for displaying an image based on a video signal received from an external computer which is connected to an input device, the display unit being separate from the external computer and comprising:

a receiving/transmitting unit receiving from said external computer a first control signal generated in response to a control instruction inputted through said input device connected to said external computer and a second control signal generated based on a program running on said external computer and transmitting an acknowledge signal to said external computer to inform that said first and second control signals are received; and a memory having stored therein control data regarding displaying of the image;

wherein the image is controlled and displayed by using said input device connected to said external computer based on said first control signal and said control data is read from said memory in response to said second control signal thereby to control the image.

2. A display unit according to claim 1, wherein said program is previously prepared in a software for said external computer.

3. A display unit for displaying an image based on a video signal received from an external computer, the display unit being separate from the external computer and comprising:

a receiver receiving from said external computer a first control signal generated in response to a control instruction inputted through input means of said external computer and a second control signal generated based on a program running on said external computer;

a transmitter transmitting an acknowledge signal to said external computer to inform that said first and second control signals are received; and a memory having stored therein control data regarding displaying of the image;

wherein the image is controlled and displayed by using said input means of said external computer based on said first control signal and said control data is read from said memory in response to said second control signal thereby to control the image.

4. A display unit according to claim 3, wherein said input means includes a keyboard.

* * * * *

Disclaimer

6,686,895 B2—Ikuya Arai, Yokohama (JP); Kouji Kitou, Yokohama (JP); Yuji Sano, Zushi (JP). DISPLAY UNIT FOR DISPLAYING AN IMAGE BASED ON A VIDEO SIGNAL RECEIVED FROM A PERSONAL COMPUTER WHICH IS CONNECTED TO AN INPUT DEVICE. Patent dated February 3, 2004. Disclaimer filed December 18, 2012, by the assignee, Mondis Technology Ltd.

Hereby disclaims complete claims 1-4 of said patent.

(*Official Gazette, January 29, 2013*)

US006686895C1

(12) INTER PARTES REEXAMINATION CERTIFICATE (680th)
United States Patent
Arai et al.

(10) Number: US 6,686,895 C1
(45) Certificate Issued: *Aug. 28, 2013

(54) DISPLAY UNIT FOR DISPLAYING AN IMAGE BASED ON A VIDEO SIGNAL RECEIVED FROM A PERSONAL COMPUTER WHICH IS CONNECTED TO AN INPUT DEVICE

(75) Inventors: Ikuya Arai, Yokohama (JP); Kouji Kitou, Yokohama (JP); Yuji Sano, Zushi (JP)

(73) Assignee: Mondis Technology Ltd., Hampstead, London (GB)

Reexamination Request:
No. 95/000,456, Apr. 27, 2009

Reexamination Certificate for:
Patent No.: 6,686,895
Issued: Feb. 3, 2004
Appl. No.: 09/863,261
Filed: May 24, 2001

Disclaimer of Claims 1, 2, 3 and 4
Filed: Dec. 18, 2012 (1386 OG 282).

( * ) Notice: This patent is subject to a terminal disclaimer.

Related U.S. Application Data

(60) Continuation of application No. 09/498,618, filed on Feb. 7, 2000, now Pat. No. 6,304,236, which is a continuation of application No. 08/438,911, filed on May 10, 1995, now Pat. No. 6,057,812, which is a division of application No. 08/013,810, filed on Feb. 2, 1993, now Pat. No. 5,457,473.

(30) Foreign Application Priority Data

Feb. 20, 1992 (JP) ........................................ 4-069320

(51) Int. Cl.
G06F 3/14 (2006.01)
G09G 1/16 (2006.01)
G09G 5/00 (2006.01)

(52) U.S. Cl.
USPC ............................................ 345/10; 345/204

(58) Field of Classification Search
None
See application file for complete search history.

(56) References Cited

To view the complete listing of prior art documents cited during the proceeding for Reexamination Control Number 95/000,456, please refer to the USPTO's public Patent Application Information Retrieval (PAIR) system under the Display References tab.

*Primary Examiner* — Deandra Hughes

(57) ABSTRACT

An image display apparatus capable of adjusting a display picture by an input unit through a computer body is disclosed. When the user inputs a control instruction for adjusting the display picture of the display unit by the input unit connected to the computer body, a control signal addition circuit prepares a control signal Sc corresponding to the control instruction and adds the control signal to a video signal R, G or B or a synchronizing signal Hs or Vs produced by a display control circuit during a vertical retrace period. A control signal separation circuit separates the added control signal Sc from the video signal R, G or B or the synchronizing signal Hs or Vs produced by the control signal addition circuit. A display control circuit produces adjustment signals Sa and Sb on the basis of the control signal from the control signal separation circuit to adjust a video circuit and a deflection circuit. Thus, the user can adjust the display picture by the input unit near at hand without extending the hands to adjustment switches of the display unit.

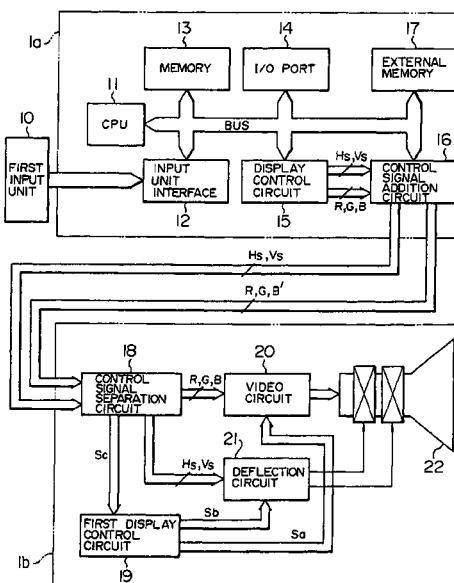

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-4 are now disclaimed.

* * * * *